(12) United States Patent
Borse et al.

(10) Patent No.: US 11,649,301 B2
(45) Date of Patent: May 16, 2023

(54) ACTIVATOR-NUCLEATOR FORMULATIONS

(71) Applicant: Dow Global Technologies LLC, Midland, MI (US)

(72) Inventors: Nitin Borse, Pearland, TX (US); Zhenshuo Bobby Liu, Missouri City, TX (US); Ian M. Munro, Lake Jackson, TX (US); Swapnil B. Chandak, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 214 days.

(21) Appl. No.: 17/054,332

(22) PCT Filed: Jun. 7, 2019

(86) PCT No.: PCT/US2019/035918
§ 371 (c)(1),
(2) Date: Nov. 10, 2020

(87) PCT Pub. No.: WO2019/241043
PCT Pub. Date: Dec. 19, 2019

(65) Prior Publication Data
US 2021/0163633 A1 Jun. 3, 2021

Related U.S. Application Data

(60) Provisional application No. 62/683,884, filed on Jun. 12, 2018.

(51) Int. Cl.
| | | |
|---|---|---|
| C08F 4/659 | (2006.01) | |
| C08F 10/02 | (2006.01) | |
| C08F 2/44 | (2006.01) | |
| C08F 2/06 | (2006.01) | |
| C08F 4/02 | (2006.01) | |
| C08F 4/655 | (2006.01) | |
| C08F 210/16 | (2006.01) | |

(52) U.S. Cl.
CPC .............. *C08F 2/44* (2013.01); *C08F 2/06* (2013.01); *C08F 4/025* (2013.01); *C08F 4/6555* (2013.01); *C08F 210/16* (2013.01); *C08F 4/659* (2013.01); *C08F 10/02* (2013.01); *C08F 2410/01* (2013.01)

(58) Field of Classification Search
CPC .......... C08F 2/44; C08F 210/16; C08F 10/02; C08F 110/02; C08F 4/659
See application file for complete search history.

(56) References Cited

U.S. PATENT DOCUMENTS

| | | |
|---|---|---|
| 3,324,095 A | 6/1967 | Carrick et al. |
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,588,790 A | 5/1986 | Jenkins, III et al. |
| 4,882,400 A | 11/1989 | Dumain et al. |
| 4,988,783 A | 1/1991 | Beran et al. |
| 4,994,534 A | 2/1991 | Rhee et al. |
| 5,116,795 A * | 5/1992 | Fries ............... C08F 10/00 585/512 |
| 5,258,449 A | 11/1993 | Firdaus et al. |
| 5,352,749 A | 10/1994 | DeChellis et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 6,489,408 B2 | 12/2002 | Mawson et al. |
| 7,491,762 B2 | 2/2009 | Wolters et al. |

(Continued)

FOREIGN PATENT DOCUMENTS

| | | |
|---|---|---|
| CN | 102603941 | 7/2012 |
| EP | 0634421 | 1/1995 |

(Continued)

OTHER PUBLICATIONS

Seven, K.M et al., "Nucleating agents for high-density polyethylene-a review", Polym. Eng. Sci., 2016; vol. 56: pp. 541-554.
Wang, "A novel catalytic way of comprising a ?-nucleating agent in isotactic polypropylene: Catalyst design strategy and polymerization-assisted dispersion", Polymer, 2017, vol. 113: pp. 259-266.
Polypropylene Handbook, 1996, pp. 76-78, Hanser Publishers.
Claudio De Rosa, "Tailoring the properties of polypropylene in the polymerization reactor using polymeric nucleating agents as prepolymers on the Ziegler-Natta catalyst granule", Polym. Chem., 2017; vol. 8: pp. 655-660.
PCT/US2019/035918, International Search Report and Written Opinion dated Sep. 16, 2019.

*Primary Examiner* — Rip A Lee

(57) ABSTRACT

An activator-nucleator formulation comprising an activating effective amount of (A) an alkylaluminum(chloride) compound (compound (A)); and a nucleating effective amount of a compound (B) selected from at least one of compounds (B1) to (B3): (B1) calcium (1R,2S)-cis-cyclohexane-1,2-dicarboxylate (1:1); (B2) calcium stearate (1:2), and (B3) zinc stearate (1:2); wherein the compound (A) is effective for activating a Ziegler-Natta procatalyst to give a Ziegler-Natta catalyst; and wherein the compound (B) is effective for lowering isothermal crystallization peak time period of a semicrystalline polyethylene polymer made in a polymerization process by the Ziegler-Natta catalyst. A method of polymerizing ethylene, and optionally 0, 1, or more alpha-olefin comonomers, in a polymerization process conducted in a polymerization reactor, the method comprising contacting ethylene, and optionally 0, 1, or more alpha-olefin comonomers, with the Ziegler-Natta catalyst system to give a semicrystalline polyethylene polymer. The semicrystalline polyethylene polymer made by the method of polymerizing.

9 Claims, No Drawings

(56) References Cited

U.S. PATENT DOCUMENTS

| | | |
|---|---|---|
| 7,659,336 B2 | 2/2010 | Wolters et al. |
| 7,786,203 B2 | 8/2010 | Hanssen et al. |
| 8,809,433 B2 | 8/2014 | Borke et al. |
| 11,248,066 B2 * | 2/2022 | Munro .................. C08F 4/6555 |
| 11,325,927 B2 * | 5/2022 | Mariott ................. C08F 210/16 |
| 11,325,928 B2 * | 5/2022 | Mariott ..................... C07F 7/28 |
| 2006/0173123 A1 | 8/2006 | Yang et al. |
| 2007/0036960 A1 | 2/2007 | Lambert et al. |
| 2008/0139718 A1 | 6/2008 | Reyntjens et al. |
| 2010/0084363 A1 | 4/2010 | Michie, Jr. et al. |
| 2012/0101209 A1 | 4/2012 | Khanna et al. |
| 2016/0369019 A1 | 12/2016 | Chen et al. |

FOREIGN PATENT DOCUMENTS

| | | |
|---|---|---|
| EP | 0794200 A | 9/1997 |
| EP | 0802202 | 10/1997 |
| WO | 2014075381 | 5/2014 |

* cited by examiner

ACTIVATOR-NUCLEATOR FORMULATIONS

FIELD

Activator-nucleator formulations, methods of making and using same, Ziegler-Natta catalysts containing same, and polyolefin polymers.

INTRODUCTION

Patent application publications in or about the field include US 2007/0036960 A1; US 2008/0139718 A1; US 2010/0084363 A1; US 2012/0101209 A1; and US 2016/0369019 A1. Patents in the field include U.S. Pat. Nos. 5,258,449; 7,491,762; 7,659,336 B2; 7,786,203 B2; and 8,809,433 B2. Publications in or about the field include Seven, K. M. et al., Nucleating agents for high-density polyethylene—a review, *Polym. Eng. Sci.,* 2016; vol. 56: pp. 541-554 (DOI: 10.1002/pen.24278); Claudio De Rosa, et al., Tailoring the properties of polypropylene in the polymerization reactor using polymeric nucleating agents as pre-polymers on the Ziegler-Natta catalyst granule, *Polym. Chem.,* 2017; vol. 8: pp. 655-660 (DOI: 10.1039/c6py01950a); and N. Wang, et al., A novel catalytic way of comprising a β-nucleating agent in isotactic polypropylene: Catalyst design strategy and polymerization-assisted dispersion, *Polymer,* 2017, vol. 113: pp. 259-266 (DOI: 10.1016/j.polymer.2017.02.075).

Ziegler-Natta catalysts enhance rates of polymerization of olefin monomer(s) making polyolefin polymers. Typical Ziegler-Natta catalysts contain vanadium or titanium disposed on a support material such as $MgCl_2$, a divided solid that has high surface area. The titanium Ziegler-Natta catalyst is made by contacting a titanium(IV) compound (e.g., $TiCl_4$) with $MgCl_2$ and a reducing agent (e.g., trihexylaluminum) effective for chemically reducing the titanium(IV) compound to a titanium(III) compound (e.g., $TiCl_3$) so as to make a Ziegler-Natta procatalyst, and then contacting the Ziegler-Natta procatalyst with an activator (e.g., triethylaluminum) to increase catalytic activity thereof and thereby make the Ziegler-Natta catalyst. The reducing agent and activator differ from each other in composition and function.

Usually the Ziegler-Natta catalyst is provided as a constituent of a Ziegler-Natta catalyst system and its precursor Ziegler-Natta procatalyst is provided as a constituent of a precursor Ziegler-Natta procatalyst system. The "system" contains at least one additional component other than the Ziegler-Natta (pro)catalyst per se, reducing agent, or activator. Examples of the at least one additional component are an organic modifier and a carrier material.

The organic modifier may be an electron-donating compound such as an ether compound. The organic modifier may attenuate the catalytic activity or selectivity of the Ziegler-Natta (pro)catalyst of the Ziegler-Natta (pro)catalyst system, or may alter the composition or reactivity of the activator.

The carrier material is a particulate solid and may be porous, such as mesoporous, and thus may define exterior surfaces (outside of pores) and interior surfaces (inside pores). A typical carrier material is an alumina, a clay, or a silica. The carrier material's features such as size, shape, porosity, and surface chemistry thereof may control accessibility of the monomer(s) to the Ziegler-Natta catalyst of the Ziegler-Natta catalyst system containing the carrier material. The features may vary from carrier material to carrier material and their effects may vary from catalyst system type to catalyst system type depending on how the catalyst system is configured. This in turn largely depends upon the methods of preparing the carrier material and catalyst system and the composition and structure of the carrier material.

In supported Ziegler-Natta catalyst systems the carrier material may be mesoporous spheres of hydrophilic silica, which is untreated, amorphous and porous wherein the interior and exterior surfaces are hydrophilic. A supported Ziegler-Natta catalyst system generally may be made by a concentrating method comprising suspending the hydrophilic silica in a tetrahydrofuran solution of titanium tetrachloride and magnesium dichloride to form a suspension, concentrating the suspension under vacuum to give a precipitated intermediate, contacting the precipitated intermediate with a reducing agent to give a supported Ziegler-Natta procatalyst system, and contacting the supported Ziegler-Natta procatalyst system with an activator to give the supported Ziegler-Natta catalyst system. It is believed that the concentrating method results in the titanium tetrachloride/magnesium dichloride being precipitated inside the pores of the hydrophilic silica. After the chemically reducing and activating steps the pores contain most or all of the Ziegler-Natta catalyst. Thus without wishing to be bound by theory, it is believed that the pores of the hydrophilic silica largely define the size and shape of, and control monomer access to the Ziegler-Natta catalyst in supported Ziegler-Natta catalyst systems. During polymerizations, ethylene and/or alpha-olefin may enter the pores of the hydrophilic silica in order to contact the Ziegler-Natta catalyst therein, and growth of polymer therein may be restricted by the mesopore diameters and pore volume. Commercial supported Ziegler-Natta catalyst systems include UCAT™ A from Univation Technologies, LLC.

In spray-dried Ziegler-Natta catalyst systems, the carrier material may be a hydrophobic fumed silica, which is amorphous and porous wherein the interior and exterior surfaces are hydrophobic. The spray-dried Ziegler-Natta catalyst systems may be made by a spray-drying method comprising suspending the hydrophobic fumed silica in a tetrahydrofuran solution of the titanium tetrachloride and magnesium dichloride to form a mixture, spray-drying the mixture to give a spray-dried intermediate, contacting the spray-dried intermediate with a reducing agent to give a spray-dried Ziegler-Natta procatalyst system, and contacting the spray-dried Ziegler-Natta procatalyst system with an activator to give the spray-dried Ziegler-Natta catalyst system. It is believed that the hydrophobic fumed silica and spray-drying method results in the hydrophobic pores of the spray-dried solid containing relatively little or none of the titanium tetrachloride/magnesium dichloride Ziegler-Natta catalyst, and after the chemically reducing and activating steps the pores contain little or none of the Ziegler-Natta catalyst, which instead largely resides on the exterior surfaces of the carrier material. Thus without wishing to be bound by theory, it is believed that the exterior surfaces of the carrier material largely define the size and shape of, and control monomer access to, the Ziegler-Natta catalyst in spray-dried Ziegler-Natta catalyst systems. During polymerizations, ethylene and/or alpha-olefin may contact the Ziegler-Natta catalyst on the exterior surface of the silica, a polymer produced thereon may grow largely unrestricted by pore dimensions. Commercial spray-dried Ziegler-Natta catalyst systems include UCAT™ J from Univation Technologies, LLC.

A supported Ziegler-Natta procatalyst system may respond differently to different factors than the response of the spray-dried Ziegler-Natta procatalyst system. Such differentiating factors include activator composition or concentration, carrier material composition/structure, and polymerization process conditions (e.g., monomer composition, bed temperature, ethylene partial pressure, alpha-olefin/ethylene molar ratio, presence or absence of oxygen tailoring, and/or presence or absence of hydrogen). Consequently, performance of the respective catalyst systems and processes using same, and characteristics of the polyolefin polymers made therewith, are not inherently predictive of each other.

SUMMARY

An activator-nucleator formulation comprising an activating effective amount of (A) an alkylaluminum(chloride) compound of formula (I): $Al((C_1-C_6)alkyl)_m(chloro)_n$ (I), wherein subscript m is an integer from 1 to 3, subscript n is an integer from 2 to 0, the sum of subscripts m+n=3, and each chloro is a chlorine atom (compound (A)); and a nucleating effective amount of a compound (B) selected from at least one of compounds (B1) to (B3): (B1) calcium (1R,2S)-cis-cyclohexane-1,2-dicarboxylate (1:1); (B2) calcium stearate (1:2), and (B3) zinc stearate (1:2).

A Ziegler-Natta procatalyst system comprising the compound (B) and (C) a Ziegler-Natta procatalyst; and, optionally, the compound (A).

A Ziegler-Natta catalyst system comprising the compound (B) and (D) a Ziegler-Natta catalyst.

A method of polymerizing ethylene, and optionally an alpha-olefin comonomer(s), in a polymerization process conducted in a polymerization reactor, the method comprising contacting ethylene, and optionally alpha-olefin comonomer(s), with the Ziegler-Natta catalyst system in a polymerization reactor to give a semicrystalline polyethylene polymer.

The semicrystalline polyethylene polymer made by the method of polymerizing.

A manufactured article comprising the semicrystalline polyethylene polymer.

DRAWING(S)

FIG. 1 contains a DSC exotherm plot of heat flow versus time for a test sample CE(C) of a semicrystalline polyethylene polymer at 122° C.

DETAILED DESCRIPTION

The Introduction, Summary and Abstract are incorporated here by reference.

Certain inventive embodiments are described below as numbered aspects for easy cross-referencing. Additional embodiments are described elsewhere herein.

Aspect 1. An activator-nucleator formulation comprising, alternatively consisting essentially of, alternatively consisting of, an activating effective amount of (A) an alkylaluminum(chloride) compound of formula (I): $Al((C_1-C_6)alkyl)_m(chloro)_n$ (I), wherein subscript m is an integer from 1 to 3, subscript n is an integer from 2 to 0, the sum of subscripts m+n=3, and each chloro is a chlorine atom (compound (A)); and a nucleating effective amount of a compound (B) selected from at least one of compounds (B1) to (B3): (B1) calcium (1R,2S)-cis-cyclohexane-1,2-dicarboxylate (1:1); (B2) calcium stearate (1:2), and (B3) zinc stearate (1:2). The activator-nucleator formulation may be free of a polyolefin, alternatively may be free of any polymer.

Aspect 2. The activator-nucleator formulation of aspect 1, wherein the compound (A) is the alkylaluminum(chloride) compound of formula (I) characterized by any one of limitations (i) to (iii): (i) subscript m is 3 and subscript n is 0; (ii) each ($C_1-C_6$)alkyl is ethyl, butyl, or hexyl; and (iii) each ($C_1-C_6$)alkyl is ethyl. In some aspects the alkylaluminum(chloride compound of formula (I) is characterized by any one of limitations (iv) to (xi): (iv) both (i) and (ii); (v) both (i) and (iii); (vi) subscript m is 2 and subscript n is 1; (vii) both (ii) and (vi); (viii) both (iii) and (vi); (ix) subscript m is 1 and subscript n is 2; (x) both (ii) and (ix); (xi) both (iii) and (ix).

Aspect 3. The activator-nucleator formulation of aspect 1 or 2, wherein the compound (B) is any one of limitations (i) to (iii): (i) (B1) calcium (1R,2S)-cis-cyclohexane-1,2-dicarboxylate (1:1); (ii) (B2) calcium stearate (1:2); and (iii) (B3) zinc stearate (1:2). In some aspects compound (B) is any one of limitations (iv) to (vii): (iv) both (i) and (ii); (v) both (i) and (iii); (vi) both (ii) and (iii); (vii) each of (i), (ii), and (iii).

Aspect 4. A Ziegler-Natta procatalyst system comprising, alternatively consisting essentially of, alternatively consisting of, the compound (B) and (C) a Ziegler-Natta procatalyst; and, optionally, the compound (A). In some aspects the Ziegler-Natta procatalyst system comprises, alternatively consists essentially of, alternatively consists of, the compounds (A), (B), and (C), wherein the Ziegler-Natta procatalyst system is made by contacting the (C) Ziegler-Natta procatalyst with the activator-nucleator formulation of any one of aspects 1 to 3. The Ziegler-Natta procatalyst system may be free of a polyolefin, alternatively free of any organic polymer.

Aspect 5. A Ziegler-Natta catalyst system comprising, alternatively consisting essentially of, alternatively consisting of, the compound (B) and (D) a Ziegler-Natta catalyst. The Ziegler-Natta catalyst system may be free of a polyolefin, alternatively may be free of any polymer.

Aspect 6. A method of polymerizing ethylene, and optionally 0, 1, or more alpha-olefin comonomers, in a gas phase or liquid phase polymerization process conducted in a gas phase or liquid phase polymerization reactor, the method comprising contacting ethylene, and optionally 0, 1, or more alpha-olefin comonomers, with the Ziegler-Natta catalyst system of aspect 5 to give a semicrystalline polyethylene polymer.

Aspect 7. The method of aspect 6 wherein the Ziegler-Natta catalyst system is a spray-dried Ziegler-Natta catalyst system further comprising at least one of a carrier material and an organic modifier that is tetrahydrofuran (THF).

Aspect 8. The method of aspect 7 comprising the gas phase polymerization of the ethylene and the ($C_3-C_{20}$)alpha-olefin (e.g., one ($C_3-C_{20}$)alpha-olefin, alternatively two different ($C_3-C_{20}$)alpha-olefins) in the presence of molecular hydrogen gas ($H_2$) and, optionally, an induced condensing agent (ICA) in one, two or more gas phase polymerization reactors under polymerizing conditions, thereby making the semicrystalline polyethylene polymer; wherein the polymerizing conditions comprise a reaction temperature from 80 degrees (°) to 110° Celsius (C.); a molar ratio of the molecular hydrogen gas to the ethylene ($H_2/C_2$ molar ratio) from 0.001 to 0.050; and a molar ratio of the comonomer to the ethylene (Comonomer/$C_2$ molar ratio) from 0.005 to 0.10. In some aspects each ($C_3-C_{20}$)alpha-olefin may be a ($C_4-C_8$)alpha-olefin, e.g., 1-butene, 1-hexene, 1-octene, or a combination of any two thereof; alternatively 1-butene or 1-hexene.

Aspect 9. A semicrystalline polyethylene polymer made by the method of polymerizing of any one of aspects 6 to 8.

Aspect 10. A manufactured article comprising the semicrystalline polyethylene polymer of aspect 9. The manufactured article may be a film, which may have one or more improved optical properties.

Aspect 11. The method of aspect 6 comprising the liquid phase polymerization process conducted in the liquid phase polymerization reactor.

Aspect 12. The method of aspect 11 wherein the liquid phase polymerization process is a slurry phase polymerization process and the liquid phase polymerization reactor is a slurry phase polymerization reactor.

Aspect 13. A semicrystalline polyethylene polymer made by the method of polymerizing of aspect 11 or 12.

Aspect 14. A manufactured article comprising the semicrystalline polyethylene polymer of aspect 13.

The method of any one of aspects 6 to 8 and 11 of polymerizing ethylene, and optionally 0, 1, or more alpha-olefin comonomers, in a polymerization process conducted in a polymerization reactor includes a method of making a multi-modal (e.g., bimodal) semicrystalline polyethylene polymer in a staged polymerization process conducted in a staged polymerization reactor. The semicrystalline polyethylene polymer made by the method of polymerizing includes the multimodal (e.g., bimodal) semicrystalline polyethylene polymer. The manufactured article comprising the semicrystalline polyethylene polymer includes a manufactured article comprising the multimodal (e.g., bimodal) semicrystalline polyethylene polymer.

The activator-nucleator formulation may be effective for increasing productivity of the Ziegler-Natta catalyst in the gas phase polymerization process. The Ziegler-Natta catalyst is effective in the gas phase polymerization process for polymerizing ethylene, and optionally 0, 1, or more alpha-olefin comonomers, in a gas phase polymerization reactor to give the semicrystalline polyethylene polymer. Unpredictably: (a) the compound (A) is effective as a procatalyst activator in the presence of the compound (B), (b) the Ziegler-Natta catalyst is active in the gas phase polymerization process in the presence of the compound (B), and (c) the compound (B) is capable of functioning as a nucleating agent after being exposed to activating conditions and while being exposed to the gas phase polymerization conditions.

The activator-nucleator formulation may comprise, alternatively consist essentially of, alternatively consist of, from 60.0 to 70.0 wt % of the compound (A) and from 40.0 to 30.0 wt % of the compound (B), based on total weight of compounds (A) and (B).

The activator-nucleator formulation may further comprise, alternatively consist essentially of a hydrocarbon liquid that is free of carbon-carbon double or triple bonds. The hydrocarbon liquid may be an aromatic hydrocarbon, an alkyl-substituted aromatic hydrocarbon, an alkane, or a mixture of any two or more thereof. In some aspects the liquid hydrocarbon is a mineral oil. The liquid hydrocarbon may be used to dilute the activator-nucleator formulation, or constituent thereof.

The activator-nucleator formulation may be in the form of a 1-part formulation or a multi-part, e.g., a 2-part, formulation. A 2-part embodiment of the activator-nucleator formulation may have one of components (A) in (B) in one part, and the other of components (A) and (B) in the other part. Alternatively, the 2-part embodiment of the activator-nucleator formulation may have one of components (A) in (B) in one part, and the other of components (A) and (B) in both parts.

Compound (A). The compound (A) of formula (I) may comprise a $(C_1-C_4)$alkyl-containing aluminum compound.

The $(C_1-C_4)$alkyl-containing aluminum compound may independently contain 1, 2, or 3 $(C_1-C_4)$alkyl groups and 2, 1, or 0 groups each independently selected from chloride atom and $(C_1-C_4)$alkoxide. Each $(C_1-C_4)$alkyl may independently be methyl; ethyl; propyl; 1-methylethyl; butyl; 1-methylpropyl; 2-methylpropyl; or 1,1-dimethylethyl. Each $(C_1-C_4)$alkoxide may independently be methoxide; ethoxide; propoxide; 1-methylethoxide; butoxide; 1-methylpropoxide; 2-methylpropoxide; or 1,1-dimethylethoxide. The $(C_1-C_4)$alkyl-containing aluminum compound may be triethylaluminum (TEA), triisobutylaluminum (TIBA), diethylaluminum chloride (DEAC), diethylaluminum ethoxide (DEAE), ethylaluminum dichloride (EADC), or a combination or mixture of any two or more thereof. The activator may be triethylaluminum (TEA), triisobutylaluminum (TIBA), diethylaluminum chloride (DEAC), or ethylaluminum dichloride (EADC). The compound (A) may be a combination of any two or more of the foregoing compounds. The compound (A) is effective for activating a Ziegler-Natta procatalyst to give a Ziegler-Natta catalyst.

Compound (B). The compound (B) may be any one, alternatively any two, alternatively a combination of each of the compounds (B1) to (B3). (B1) calcium (1R,2S)-1,2-cyclohexanedicarboxylate (1:1) has CAS number 491589-22-1 and is available as HYPERFORM HPN20E from Milliken & Company, Spartanburg, S.C., USA. (B2) calcium stearate (1:2) is a compound of formula $Ca(O_2C(CH_2)_{16}CH_3)_2$, has CAS number 1592-23-0, and is available from Millipore Sigma (formerly Sigma-Aldrich Company), St. Louis, Mo., USA. (B3) zinc stearate (1:2) is a compound of formula $Zn(O_2C(CH_2)_{16}CH_3)_2$, has CAS number 557-05-1, and is available from Millipore Sigma.

The compound (B) is effective for enhancing crystallizing of the semicrystalline polyethylene polymer when the semicrystalline polyethylene polymer is a melt (liquid form), wherein the temperature of the melt is from 1° to 12° C. lower than the melting temperature, $T_m$, of the semicrystalline polyethylene polymer's. The $T_m$ may vary at least in part with change in the density and/or alpha-olefin comonomeric content (if any) of the semicrystalline polyethylene polymer. The densities may be from those of very low density polyethylene (VLDPE) to those of high density polyethylene (HDPE). The $T_m$ of the semicrystalline polyethylene polymer may be from 105° to 140° C., alternatively from 108° to 140° C., alternatively from 108° to 135° C., alternatively from 110° to 135° C., alternatively from 120.0° to 135° C. In some aspects the $T_m$ of the semicrystalline polyethylene polymer is from 131.0° to 133.0° C., alternatively from 131.0° to 132.0° C. The $T_m$ is the starting point of the melting temperature. In aspects where the semicrystalline polyethylene polymer has two melting temperatures, the $T_m$ is the starting point of the lower melting temperature. In some aspects the enhancing crystallizing comprises lowering isothermal crystallization peak time period of the semicrystalline polyethylene polymer when measured at a same isothermal crystallization temperature, $T_{ix}$. In some aspects $T_{ix}$ is from 5° to 15° C. less than $T_m$. In some aspects $T_{ix}$ is 121.0°, 121.5°, 122.0°, 122.5°, 123.0°, 123.5°, or 124.0° C., and the compound (B) is effective at such $T_{ix}$ for lowering isothermal crystallization peak time period of a semicrystalline polyethylene polymer made in the method of polymerizing ethylene by the Ziegler-Natta catalyst relative to a comparative Ziegler-Natta catalyst that is the same except it has not been exposed to the compound (B). All isothermal crystallization peak time periods are measured by differential scanning calorimetry (DSC) according to the Isothermal Crystallization Peak Time Period Test Method described later.

The Ziegler-Natta catalyst system may comprise, alternatively consist essentially of, alternatively consist of, from 20.0 to 95.0 wt % of the compound (A) based on total weight of the Ziegler-Natta catalyst system.

The (D) Ziegler-Natta catalyst is made by contacting the (C) Ziegler-Natta procatalyst with the activator-nucleator formulation of any one of aspects 1 to 3. In some aspects the Ziegler-Natta catalyst is made by an activating reaction between the compounds (A) and (C) of the ad rem embodiment of the Ziegler-Natta procatalyst system. In other aspects the Ziegler-Natta catalyst is made by non-inventive methods, e.g., the Ziegler-Natta catalyst may be UCAT™ J from Univation Technologies, LLC.

The (D) Ziegler-Natta catalyst may be supported or spray-dried on a carrier material. The carrier material may be an alumina, silica or clay. The carrier material may be a silica, wherein the silica is a hydrophilic fumed silica or a hydrophobic fumed silica. The hydrophobic fumed silica is premade separately by pre-treating the hydrophilic fumed silica with an effective amount of a hydrophobing agent. The method may further comprise quenching (e.g., with a scavenger agent such as water or steam) the Ziegler-Natta catalyst of the Ziegler-Natta catalyst system that is in the semicrystalline polyethylene polymer to give a composition comprising the semicrystalline polyethylene polymer and the by-products.

The Ziegler-Natta catalyst system is effective for enhancing rate of the polymerization. The Ziegler-Natta catalyst system may be effective for increasing catalyst productivity (CP) of the Ziegler-Natta catalyst of the system by at least 2%, alternatively at least 5%, alternatively at least 6%; and at most 12%, alternatively at most 9%, alternatively at most 8.2% relative to catalyst productivity of a comparative Ziegler-Natta catalyst of a comparative Ziegler-Natta catalyst system that is the same except it is free of the compound (B). CP equals mass of semicrystalline polyethylene polymer made per mass of Ziegler-Natta catalyst system used per hour of polymerizing reaction. The amount of the compound (B) used in the Ziegler-Natta catalyst system is effective for lowering isothermal crystallization peak time period, measured at an isothermal crystallization temperature, $T_{ix}$, of the semicrystalline polyethylene polymer made thereby relative to a comparative isothermal crystallization peak time period (measured at a same isothermal crystallization temperature, $T_{ix}$) of a comparative semicrystalline polyethylene polymer made with a comparative Ziegler-Natta catalyst system that is the same except it is free of the compound (B). The amount of the compound (B) may be sufficient to ultimately provide from 10 to 200 parts per million of the compound (B) in the semicrystalline polyethylene polymer. In the method the compound (B) is effective for lowering isothermal crystallization peak time period of a semicrystalline polyethylene polymer made in a gas phase polymerization process by the Ziegler-Natta catalyst when the isothermal crystallization peak time period is measured at a same isothermal crystallization temperature ($T_{ix}$). In some aspects the isothermal crystallization peak time period of the inventive semicrystalline polyethylene polymer is any one of characteristics (i) to (ix): (i) less than 1.10 minutes when measured at $T_{ix}$ of 121.0° C.; (ii) less than 1.60 minutes measured at $T_{ix}$ of 121.5° C.; (iii) less than 2.30 minutes measured at $T_{ix}$ of 122.0° C.; (iv) less than 4.0 minutes, alternatively less than 3.60 minutes, alternatively from 2.20 to 3.53 minutes, measured at $T_{ix}$ of 122.5° C.; (v) less than 2.40 minutes measured at $T_{ix}$ of 123.0° C.; (vi) less than 3.40 minutes measured at $T_{ix}$ of 123.5° C.; (vii) less than 4.90 minutes, alternatively less than 4.40 minutes, measured at $T_{ix}$ of 124.0° C.; (viii) both (iv) and any one of (v) to (vii); and (ix) each of (iv) to (vii).

The polymerization method may comprise, alternatively consist essentially of, alternatively consist of, from >0 to 100 to 250.0 parts per million (ppm), alternatively from 1 to 99 ppm, alternatively from 20 to 80 ppm of the compound (B) in the gas phase polymerization reactor based on total reactor volume.

The semicrystalline polyethylene polymer may be a polyethylene homopolymer that contains constituent units that are derived from ethylene and is free of constituent units that are derived from an alpha-olefin. The semicrystalline polyethylene polymer may be an ethylene/($C_3$-$C_{20}$)alpha-olefin copolymer that contains monomeric constituent units that are derived from ethylene and comonomeric constituent units that are derived from one or more ($C_3$-$C_{20}$)alpha-olefin comonomer(s), respectively. In some aspects the method comprises copolymerizing ethylene and one or more ($C_3$-$C_{20}$)alpha-olefin (comonomer(s)) to give the ethylene/($C_3$-$C_{20}$)alpha-olefin copolymer composition. The ($C_3$-$C_{20}$)alpha-olefin-derived comonomeric constituent units may be derived from 1-butene; alternatively 1-hexene; alternatively 1-octene; alternatively a combination of any two thereof.

DEFINITIONS

Anhydrous: lacking $H_2O$ (i.e., having 0.00 wt % $H_2O$), alternatively having from >0.00 wt % to less than 0.05 wt %, alternatively less than 0.01 wt %, alternatively less than 0.001 wt % $H_2O$. Anhydrous form of material may be obtained from commercial sources or prepared by removing water from a water-containing form of the material using drying methods, which are well-known in the art.

Composition: a chemical composition. Arrangement, type and ratio of atoms in molecules and type and relative amounts of molecules in a substance or material.

Compound: a molecule or collection of molecules.

Concentrating: a method of slowly increasing the mass or molar amount of less volatile chemical constituent(s) per unit volume of a continuous mixture comprising more volatile and less volatile chemical constituent(s). The method gradually removes more of the more volatile chemical constituent(s) than the less volatile constituent(s) from the continuous mixture to give a concentrate having a higher mass or molar amount of the less volatile chemical constituent(s) per unit volume than did the continuous mixture. The concentrate may be a precipitated solid.

Consisting essentially of, consist(s) essentially of, and the like. Partially-closed ended expressions that exclude anything that would affect the basic and novel characteristics of that which they describe, but otherwise allow anything else. The transitional expression "consisting essentially of" used above refers to embodiments of the numbered aspects that are free of a polyolefin, but optionally may further comprise 0, 1 or more other constituents.

Consisting of and consists of. Closed ended expressions that exclude anything that is not specifically or explicitly described by the limitation that it modifies. In some aspects any one, alternatively each expression "consisting essentially of" or "consists essentially of" may be replaced by the expression "consisting of" or "consists of", respectively.

Dry. Anhydrous. A moisture content from 0 to less than 5 parts per million based on total parts by weight. Materials fed to the reactor(s) during a polymerization reaction are dry.

Effective amount: a quantity sufficient to achieve an intended and appreciable result.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: claimed film properties are measured on 25 micrometers thick monolayer films.

Fumed silica, hydrophobic pre-treated: a reaction product of contacting a hydrophilic fumed silica (untreated) with a hydrophobing agent to react with surface hydroxyl groups on the hydrophilic fumed silica, thereby modifying the surface chemistry of the hydrophilic fumed silica to give a hydrophobic fumed silica. The hydrophobing agent may be silicon based.

Fumed silica, hydrophilic (untreated): pyrogenic silica produced in a flame. Consists of amorphous silica powder made by fusing microscopic droplets into branched, chain-like, three-dimensional secondary particles, which agglomerate into tertiary particles. Not quartz. Untreated means not treated with a hydrophobing agent.

Hydrophobing agent: an organic or organosilicon compound that forms a stable reaction product with surface hydroxyl groups of fumed silica.

Induced condensing agent (ICA): An inert liquid useful for cooling materials in gas phase polymerization reactor(s) (e.g., a fluidized bed reactor).

Inert: Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Mesoporous: having an average pore diameter of from 2 to 50 nanometers (nm).

Microporous: having an average pore diameter of less than 2 nm.

Modifier (compound): a composition that alters reactivity, stability, or both of a substance on which the composition acts. Organic modifier—the composition is an organic composition.

Nucleating: forming a nucleus upon which a material may begin to crystallize.

Nucleator: a compound or agent having a nucleating effect.

Polyethylene polymer: A macromolecule, or collection of macromolecules, composed of constitutional units wherein 50 to 100 mole percent (mol %), alternatively 70 to 100 mol %, alternatively 80 to 100 mol %, alternatively 90 to 100 mol %, alternatively 95 to 100 mol %, alternatively any one of the foregoing ranges wherein the upper endpoint is <100 mol %, of such constitutional units are derived from ethylene monomer; and, in aspects wherein there are less than 100 mol % ethylenic constitutional units, the remaining constitutional units are comonomeric units derived from at least one ($C_3$-$C_{20}$)alpha-olefin; or collection of such macromolecules. Semicrystalline polyethylene polymer is characterized by an extent of crystallinity as measured by DSC according to the Crystallinity Test Method described later.

Polymerize: make a polymer by reacting monomer molecules together or make a copolymer by reacting together monomer molecules and molecules of at least one comonomer.

(Pro)catalyst: a procatalyst, a catalyst, or a combination of procatalyst and catalyst.

Quartz: an untreated, nonporous crystalline form of silicon dioxide. Particulate or bulk.

Silica. A particulate form of silicon dioxide that may be amorphous. Crystalline, or gel-like. Includes fused quartz, fumed silica, silica gel, and silica aerogel.

Spray-drying: rapidly forming a particulate solid comprising less volatile chemical constituents via aspiration of a bulk mixture of the less volatile chemical constituents and more volatile chemical constituents through a nebulizer using a hot gas. The particle size and shape of the particulate solid formed by spray-drying may be different than those of a precipitated solid.

System (chemistry): an interrelated arrangement of different chemical constituents so as to form a functioning whole.

Transport: move from place to place. Includes from reactor to reactor, tank to reactor, reactor to tank, and manufacturing plant to storage facility and vice versa.

Ziegler-Natta (pro)catalysts and Ziegler-Natta (pro)catalyst systems. See Introduction for general descriptions. All of these forms generally fall into the heterogeneous class of Ziegler-Natta (pro)catalysts and systems because they constitute a solid phase in a gas- or liquid-phase olefin polymerization reaction.

Materials ($C_3$-$C_{20}$)alpha-olefin. A compound of formula (I): $H_2C=C(H)-R$ (I), wherein R is a straight chain ($C_1$-$C_{18}$) alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene.

Carrier material. Prior to treatment with the hydrophobing agent, the carrier material is hydrophilic silica (untreated) and has variable surface area and average particle size. In some embodiments, the surface area is from 50 to 150 square meter per gram ($m^2/g$). The average particle size may be less than 1 micrometer (μm). Each of the above properties are measured using conventional techniques known in the art. The hydrophilic silica may be amorphous silica (not quartz), alternatively an amorphous silica, alternatively a fumed silica. Such silicas are commercially available from a number of sources. The silica may be in the form of spherical particles, which are obtained by a spray-drying process. The hydrophilic silica may be calcined (i.e., dehydrated) or not calcined prior to treatment with the hydrophobing agent.

Hydrophobing agent, silicon-based: an organosilicon compound that forms a stable reaction product with surface hydroxyl groups of a fumed silica. The organosilicon compound may be a polydiorganosiloxane compound or an organosilicon monomer, which contains silicon bonded leaving groups (e.g., Si-halogen, Si-acetoxy, Si-oximo (Si—ON=C<), Si-alkoxy, or Si-amino groups) that react with surface hydroxyl groups of hydrophilic fumed silica to form Si—O—Si linkages with loss of water molecule as a by-product. The polydiorganosiloxane compound, such as a polydimethylsiloxane, contains backbone Si—O—Si groups wherein the oxygen atom can form a stable hydrogen bond to a surface hydroxyl group of fumed silica. The silicon-based hydrophobing agent may be trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof.

Induced condensing agent or ICA. In some aspects the ICA is a $(C_5-C_{20})$alkane, alternatively a $(C_{11}-C_{20})$alkane, alternatively a $(C_5-C_{10})$alkane. In some aspects the ICA is a $(C_5-C_{10})$alkane. In some aspects the $(C_5-C_{10})$alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %. The use of ICA is optional. In some aspects, including some of the inventive examples described later, an ICA is used. For example, in aspects of the method of making a mixture of ICA and catalyst may be fed into a polymerization reactor. In other aspects of the method, use of ICA may be omitted, and a mixed pre-formulated dry catalyst may be fed as such into the polymerization reactor, which lacks ICA.

Ziegler-Natta (pro)catalyst systems. Independently may be in the form of a dry powder or a suspension or slurry in a saturated and/or aromatic hydrocarbon solvent. The saturated and/or aromatic hydrocarbon solvent may aid handling of the (pro)catalyst system. The saturated and/or aromatic hydrocarbon solvent may be an alkane or an alkyl-substituted benzene (toluene or xylenes). Ziegler-Natta (pro)catalyst systems independently may be made, prepared, reacted, reduced, activated, modified, handled, stored, and transported under conditions suitable for the particular purpose. Such conditions include reaction conditions, storage conditions and transportation conditions. Such conditions are generally well-known in the art. For example, the spray-dried Ziegler-Natta (pro)catalyst systems independently may be made, prepared, reacted, reduced, activated, modified, handled, stored, and transported under an inert atmosphere such as a gas composed of anhydrous $N_2$, He, and/or Ar; and/or in a saturated and/or aromatic hydrocarbon solvent such as those described herein. Such conditions may include well-known techniques for such systems such as Schlenk line techniques.

Spray Drying

Any spray-drying step herein may be performed until a dried particulate solid having a constant weight is obtained. Suitable spray-drying conditions are described later in the Examples. The spray-drying from THF may be done at a temperature from 30 degrees Celsius (° C.) to the boiling point of the THF, alternatively from 50° to 65° C., alternatively from 58° to 62° C., alternatively 60° C. The spray-drying from THF may be done for a period of time from 10 to 120 minutes, alternatively from 45 to 90 minutes, alternatively from 50 to 70 minutes, alternatively 60 minutes. The spray-drying from the hydrocarbon liquid may be done at a temperature from 30 degrees Celsius (° C.) to the boiling point of the hydrocarbon liquid, alternatively from 80° to 165° C., alternatively from 95° to 105° C. The spray-drying from the hydrocarbon liquid may be done for a period of time from 1 to 48 hours, alternatively from 3 to 30 hours, alternatively from 4 to 12 hours, alternatively 5 hours. Carrier material of the spray-dried Ziegler-Natta procatalyst system consists essentially of, alternatively consists of, the hydrophobic fumed silica, which means it contains from 0 to 5 weight percent (wt %), alternatively 0 to 0.9 wt %, alternatively 0 to 0.09 wt %, alternatively 0 wt % porous silica. Without wishing to be bound by theory, we believe that the exterior surfaces of the hydrophobic fumed silica largely define the construction of the spray-dried Ziegler-Natta procatalyst system.

Polymerization Types

The Ziegler-Natta catalyst system may be used in gas phase or liquid phase olefin polymerization reactions to enhance the rate of polymerization of monomer and/or comonomer(s). Liquid phase reactions include slurry phase and solution phase. In some aspects the olefin polymerization reaction is conducted in gas phase, alternatively liquid phase, alternatively slurry phase, alternatively solution phase. Conditions for gas phase and liquid phase olefin polymerization reactions are generally well-known. For illustration, conditions for gas phase olefin polymerization reactions are described below.

Polymerization Reactors

The polymerization may be conducted in a high pressure, liquid phase or gas phase polymerization reactor to yield the inventive polyethylene polymer. Such reactors and methods are generally well-known in the art. For example, the liquid phase polymerization reactor/method may be solution phase or slurry phase such as described in U.S. Pat. No. 3,324,095. The gas phase polymerization reactor/method may employ stirred-bed gas-phase polymerization reactors (SB-GPP reactors) and fluidized-bed gas-phase polymerization reactors (FB-GPP reactors) and an induced condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other gas phase processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

In an illustrative embodiment the polymerization method uses a pilot scale fluidized bed gas phase polymerization reactor (Pilot Reactor) that comprises a reactor vessel containing a fluidized bed of a powder of ethylene/alpha-olefin copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin, hydrogen, and oxygen being fed into the Pilot Reactor are monitored by an in-line gas chromatograph in the cycle loop in order to maintain specific concentrations that define and enable control of polymer properties. In some embodiments the gases are cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The Ziegler-Natta catalyst system may be fed as a slurry or dry powder into the Pilot Reactor from high pressure devices, wherein the slurry is fed via a syringe pump and the dry powder is fed via a metered disk. The catalyst system typically enters the fluidized bed in the lower ⅓ of its bed height. The Pilot Reactor further comprises a way of weighing the fluidized bed and isolation ports (Product Discharge System) for discharging the powder of ethylene/alpha-olefin copolymer from the reactor vessel in response to an increase of the fluidized bed weight as polymerization reaction proceeds.

Polymerization Conditions

Polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive polyethylene polymer.

At least one, alternatively each of the polymerizing conditions may be fixed (i.e., unchanged) during production of the inventive polyethylene polymer. Such fixed polymerizing conditions may be referred to herein as steady-state polymerizing conditions. Steady-state polymerizing conditions are useful for continuously making embodiments of the inventive polyethylene polymer having same polymer properties.

Alternatively, at least one, alternatively two or more of the polymerizing conditions may be varied within their defined operating parameters during production of the inventive polyethylene polymer in order to transition from the production of a first embodiment of the inventive polyethylene polymer having a first set of polymer properties to a non-inventive polyethylene polymer or to a second embodiment of the inventive polyethylene polymer having a second set of polymer properties, wherein the first and second sets of polymer properties are different and are each within the limitations described herein for the inventive polyethylene polymer. For example, all other polymerizing conditions being equal, a higher molar ratio of $(C_3-C_{20})$alpha-olefin comonomer/ethylene feeds in the inventive method of copolymerizing produces a lower density of the resulting product inventive polyethylene polymer. Transitioning from one set to another set of the polymerizing conditions is permitted within the meaning of "polymerizing conditions" as the operating parameters of both sets of polymerizing conditions are within the ranges defined therefore herein. A consequence of the transitioning is that any described property value for the inventive polyethylene polymer may be achieved by a person of ordinary skill in the art in view of the teachings herein.

The polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, CFCl3, trichloroethane, and difluorotetrachloroethane. Scavenging agents may be a trialkylaluminum. Slurry or gas phase polymerizations may be operated free of (not deliberately added) scavenging agents. The polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The polymerizing conditions may further include using molecular hydrogen ($H_2$) to control final properties of the polyethylene polymer. Such use of $H_2$ is generally described in Polypropylene Handbook 76-78 (Hanser Publishers, 1996). All other things being equal, using hydrogen can increase the melt flow rate (MFR) or melt index (MI) thereof, wherein MFR or MI are influenced by the concentration of hydrogen. A molar ratio of hydrogen to total monomer ($H_2$/monomer), hydrogen to ethylene ($H_2/C_2$), or hydrogen to comonomer ($H_2/\alpha$-olefin) may be from 0.0001 to 10, alternatively 0.0005 to 5, alternatively 0.001 to 3, alternatively 0.001 to 0.10.

The polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

In some aspects the gas-phase polymerization is conducted in a fluidized bed-gas phase polymerization (FB-GPP) reactor under relevant gas phase, fluidized bed polymerization conditions. Such conditions are any variable or combination of variables that may affect a polymerization reaction in the FB-GPP reactor or a composition or property of an ethylene/alpha-olefin copolymer product made thereby. The variables may include reactor design and size, catalyst composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), absence or presence of an induced condensing agent (ICA), average polymer residence time (avgPRT) in the reactor, partial pressures of constituents, feed rates of monomers, reactor bed temperature (e.g., fluidized bed temperature), nature or sequence of process steps, time periods for transitioning between steps. In performing an inventive method, variables other than that/those being described or changed by the inventive method may be kept constant.

Comonomer/ethylene gas molar ratio $C_x/C_2$ of comonomer ($C_x$) and ethylene ($C_2$) being fed into the FB-GPP reactor may be from 0.0001 to 0.1, alternatively from 0.0002 to 0.05, alternatively from 0.0004 to 0.02. Subscript x indicates the number of carbon atoms per comonomer molecule and may be an integer from 3 to 20, alternatively 4, 6, or 8.

Ethylene partial pressure in the FB-GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Hydrogen to ethylene ($H_2/C_2$) gas molar ratios in the FB-GPP reactor may be from 0.0001 to 0.25, alternatively from 0.0005 to 0.200, alternatively from 0.005 to 0.149, alternatively from 0.009 to 0.109, alternatively from 0.010 to 0.100.

Oxygen ($O_2$) concentration relative to ethylene ("$O_2/C_2$", volume parts $O_2$ per million volume parts ethylene (ppmv)) in the FB-GPP reactor. Typically, oxygen is not purposely introduced into the FB-GPP reactor. In some embodiments the FB-GPP reactor is substantially free or free of $O_2$, e.g., the $O_2/C_2$ is 0.0000 to 0.0001 ppmv, alternatively 0.0000 ppmv.

Reactor bed temperature in the FB-GPP reactor may be from 90° to 120° C., alternatively from 95° to 115° C., alternatively from 99° to 110° C., alternatively from 100.0° to 109° C., alternatively from 87.0° to 89° C.

Residence time, average for polymer (avgPRT). The number of minutes or hours on average the polymer product resides in the FB-GPP reactor. The avgPRT may be from 30 minutes to 10 hours, alternatively from 60 minutes to 5 hours, alternatively from 90 minutes to 4 hours, alternatively from 1.7 to 3.0 hours.

Gas Phase Reactor and Polymerization Method Start-Up or Restart

Start-up or restart of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed pre-loaded or loaded, respectively, into the fluidized bed reactor. The polymer seedbed may be composed of powder of a polyethylene polymer such as a polyethylene homopolymer or the ethylene/alpha-olefin copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the Ziegler-Natta catalyst system.

A compound includes all its isotopes and natural abundance and isotopically-enriched forms. The enriched forms may have medical or anti-counterfeiting uses.

Any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

The following apply unless indicated otherwise. Alternatively precedes a distinct embodiment. ASTM means the standards organization, ASTM International, West Conshohocken, Pa., USA. ISO means the standards organization, International Organization for Standardization, Geneva, Switzerland. Any comparative example is used for illustration purposes only and shall not be deemed prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). Ranges include endpoints, subranges, and whole and/or fractional values subsumed therein, except a range of integers does not include fractional values. Room temperature: 23° C.±1° C.

Test Methods

Catalyst Productivity Test Method: calculated as kilograms polymer resin made per kilogram of catalyst used ("kg copolymer/kg catalyst" or, simply, "kg/kg"). The calculation of kilogram of catalyst used is based on amount of titanium in polymer as measured by X-ray Fluorescence Spectrometry ("Ti IXRF") or by Inductively Coupled Plasma Optical Emission Spectrometry ("Ti ICPES"). Catalyst productivity may be expressed as a range from kg/kg (determined by Ti IXRF) to kg/kg (determined by Ti ICPES).

Crystallinity and Melting Temperature Test Method: measured by differential scanning calorimetry (DSC). Prepare a test sample of polyethylene polymer according to the DSC Test Sample Preparation Method described below. Use a TA Instruments Q1000 DSC, equipped with a RCS (Refrigerated Cooling System) and an autosampler module to perform this analysis. During testing, use a nitrogen purge gas flow of 50 mL/min. Ramp up and ramp down the temperature of the sample to create a heat flow versus temperature profile. First, rapidly heat the test sample to 180° C., and hold the temperature at 180° C. for 3 minutes in order to remove its thermal history. Next, cool the test sample to −40° C. at a cooling rate of 10° C. per minute, and hold the cooled test sample at −40° C. for 3 minutes. Then reheat the test sample to 150° C. (this is the "second heat" ramp) at a heating rate of 10° C. per minute. Record the cooling and second heating curves. Analyze the cooling curve by setting baseline endpoints from the beginning of crystallization to −20° C. Analyze the second heating curve by setting baseline endpoints from −20° C. to the end of melt. Determine values for peak melting temperature (Tm), peak crystallization temperature (Tc), the heat of fusion (Hf) (in Joules per gram), and the percent (%) crystallinity for polyethylene samples calculated using Equation 1:

$$\% \text{ Crystallinity} = [(H_f (J/g))/(292 \ J/g)] \times 100 \quad \text{(Eq. 1).}$$

Report the heat of fusion ($H_f$) and the peak melting temperature from the second heat curve.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

DSC Test Sample Preparation Method. Prepare a test sample of semicrystalline polyethylene polymer for DSC testing by pressing a test sample of semicrystalline polyethylene polymer into a thin film, and melting the thin film at about 175° C. to give a thin melt, and air-cooling the thin melt to approximately 25° C. to give a cooled polymer. Extract a 3 to 10 milligram (mg), 6 millimeter (mm) diameter specimen from the cooled polymer. Weigh the extracted specimen, place the weighed specimen in a light aluminum pan (pan weighs about 50 mg), and crimp the pan containing specimen shut to give a crimped pan.

Flow Index (190° C., 21.6 kg, "FI$_{21}$") Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.) or the equivalent in decigrams per 1.0 minute (dg/1 min.).

Flow Rate (190° C., 5.0 kilograms (kg), "I$_5$") Test Method: for ethylene-based polymer is measured according to ASTM D1238-13, using conditions of 190° C./5.0 kg, formerly known as "Condition E" and also known as I$_5$. Report results in units of grams eluted per 10 minutes (g/10 min.) or the equivalent in decigrams per 1.0 minute (dg/1 min.).

Flow Rate Ratio (190° C., "I$_{21}$/I$_5$") Test Method: calculated by dividing the value from the Flow Index I$_{21}$ Test Method by the value from the Flow Rate I$_5$ Test Method. Unitless.

Fluidized Bulk Density (FBD) Test Method: defined as weight of solids per unit volume of a fluidized bed at a given superficial gas velocity (SGV). FBD (uncorrected)=($\Delta$P*S)/(S1*H), wherein $\Delta$P is the pressure drop between bottom and middle taps in pounds per square inch (lb/in$^2$ or psi), S represents the cross-sectional area of the reactor in square inches (in$^2$), S1 represents the cross-sectional area of the reactor in square feed (ft$^2$), and H represents the distance between the bottom and middle taps in feet (ft). The FBD (uncorrected) is corrected to an actual value (FBD (corrected)) based on reactor pressure and temperature and gas density. The units of FBD (corrected) may be converted to kilograms per cubic meter (kg/m$^3$).

Gel permeation chromatography (GPC) Test Method: Weight-Average Molecular Weight Test Method: determine M$_w$, number average molecular weight (M$_n$), and M$_w$/M$_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (µL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate M$_w$ and M$_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $\alpha_{PS}$=0.67, K$_{PS}$=0.000175, and a$_x$ and K$_x$ are obtained from published literature. For polyethylene polymers, a$_x$/K$_x$=0.695/0.000579. For polypropylenes a$_x$/K$_x$=0.705/0.0002288. At each point in the resulting chromatogram, calculate concentration, c, from a baseline-subtracted DRI signal, I$_{DRI}$, using the following equation: c=K$_{DRI}$I$_{DRI}$/(dn/dc), wherein K$_{DRI}$ is a constant determined by calibrating the DRI, / indicates division, and dn/dc is the refractive index increment for the polymer. For polyethylene polymer, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0034] to [0341]. Plot of dW/d Log(MW) on the y-axis versus Log(MW) on the x-axis to give a GPC chromatogram, wherein Log(MW) and dW/d Log(MW) are as defined above.

Isothermal Crystallization Peak Time Period Test Method. Use a TA Instruments Q1000 differential scanning calorimeter (DSC) instrument equipped with a RCS (Refrigerated Cooling System) and an autosampler module. Prepare a test sample of polyethylene polymer according to the DSC Test Sample Preparation Method described above. During testing, use a nitrogen purge gas flow of 50 milliliters per minute (mL/min.). Perform a DSC analysis on the crimped pan as follows: (1) equilibrate the crimped pan at 220° C. for 3.00 minutes, (2) turn on Data Storage, (3) downramp temperature of the crimped pan at a cooling rate of 50° C. per minute to a final isothermal crystallization temperature, T$_{ix}$ (e.g., 121.0°, 121.5°, 122.0°, 122.5°, 123.0°, 123.5°, or 124.0° C.), (4) hold the heated sample at the isothermal crystallization temperature T$_{ix}$ for 60.0 minutes. Record the exotherm as a plot of heat flow in Watts per gram (W/g) of polymer specimen on y-axis versus time in minutes (min.) on the x-axis. Starting from time 0 onward, the exotherm plot may comprise (a) an initial negative peak (pointing downward), (b) a first positive peak (pointing upward), and (c) a subsequent negative peak (pointing downward). Calculate the isothermal crystallization peak time period as equal to the time difference between the first positive peak and the subsequent negative peak. For illustration see FIG. 1. In FIG. 1, the first positive peak occurs at 2.87 minutes and the subsequent negative peak occurs at 5.20 minutes. Thus in FIG. 1, the isothermal crystallization peak time period equals 5.20−2.87=2.33 minutes.

Melt Flow Ratio (190° C., "$I_{21}/I_2$") Test Method: calculated by dividing the value from the Flow Index $I_{21}$ Test Method by the value from the Melt Index $I_2$ Test Method. Unitless.

Melt Index (190° C., 2.16 kilograms (kg), "$I_2$") Test Method: for ethylene-based polymer is measured according to ASTM D1238-13, using conditions of 190° C./2.16 kg, formerly known as "Condition E" and also known as $I_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene polymer, although the inverse proportionality is not linear. Thus, the higher the molecular weight, the lower the melt index.

1% or 2% Secant Modulus Test Method: measured according to ASTM D882-12, *Standard Test Methods for Tensile Properties of Thin Plastic Sheeting*. Used either 1% or 2% secant modulus in cross direction (CD) or machine direction (MD). Report results in megapascals (MPa). 1,000.0 pounds per square inch (psi)=6.8948 MPa.

Settled Bulk Density (SBD) Test Method: is defined as weight of material per unit volume. SBD is measured by pouring under gravity an amount of polymer resin to overflow a tared 400 cubic centimeter ($cm^3$) volume cylinder after excess of polymer resin is removed by sliding a straight edge across the top of the cylinder. The resulting level full cylinder is weighed, the tare weight of the cylinder is subtracted, and the resulting resin weight is divided by the cylinder volume to get SBD in pounds per $cm^3$, which value may be converted to pounds per cubic foot ($lb/ft^3$) or to kilograms per cubic meter ($kg/m^3$).

Tensile Modulus Test Method: measured according to ASTM D882-12, *Standard Test Methods for Tensile Properties of Thin Plastic Sheeting*. Report results in cross direction (CD) as average strain at yield in percent (%) or average stress at yield in megapascals (MPa), or in machine direction (MD) as average strain at yield in percent (%). 1,000.0 pounds per square inch (psi)=6.8948 MPa.

Materials Used in Examples

1-Butene ("C4"): comonomer of formula $H_2C=C(H)CH_2CH_3$; used at the molar ratio of C4/C2 in Tables.

Ethylene ("C2"): a compound of formula $H_2C=CH_2$. Monomer used at the partial pressure of C2 in Tables 1 and 2.

Isopentane: a compound of formula $(H_3C)_2C(H)CH_2CH_3$. An induced condensing agent 1 ("ICA1"); used at the mole percent (mol %) concentration in the gas phase of a gas phase reactor relative to the total molar content of gas phase matter in Tables 1 and 2.

Molecular hydrogen gas ("$H_2$"): used at a molar ratio of $H_2/C_2$ in Tables 1 and 2.

Magnesium dichloride: a support material; obtained from SRC Worldwide Inc.

Mineral oil: obtained from Sonneborn.

Hydrophobic fumed silica 1: a carrier material; a low surface area fumed silica that has been with dimethyldichlorosilane obtained as TS-610 from Cabot Corporation.

Tetrahydrofuran: anhydrous; obtained from Pride Chemical Solution.

Titanium trichloride.AA ($TiCl_3 \cdot AA$): obtained from WR Grace. The $TiCl_3 \cdot AA$ means a mixture of a 3:1 molar ratio of $TiCl_3/AlCl_3$. Alternatively, the $TiCl_3 \cdot AA$ may be made by a reaction of 3 mole equivalents of $TiCl_4$ with one mole equivalent of aluminum (Al) metal ($Al^0$), which acts as a reducing agent, in a solvent, such as anhydrous tetrahydrofuran.

Triethylaluminum ("TEAl"): an activator; obtained from Albermarle or Akzo.

Trihexylaluminum ("TnHal"): a reducing agent; obtained from Albermarle or Akzo. Also known is tri-n-hexylaluminum.

EXAMPLES

Preparation 1 (Prep1): synthesis of a spray-dried particulate solid consisting essentially of a hydrophobic fumed silica, $MgCl_2$, and THF. Add anhydrous tetrahydrofuran (14 kg) to a feed tank. Next add finely-divided solid $MgCl_2$ (1255 g). Heat mixture to 60° C., and mix it for 5 hours to overnight to form a solution. Cool the solution to 40° C. to 45° C. Then add hydrophobic fumed silica (Cabosil TS-610, 1.6 kg) to give a suspension. Mix the suspension for 30 minutes to give a slurry of a hydrophobic fumed silica in a THF solution of $MgCl_2$. Spray the slurry in a spray dryer using the following conditions: inlet temperature 160 C, outlet temperature 110° C., feed rate approximately 45 kg per hour, total gas flow approximately 270 kg per hour, atomizer speed: varied typically approximately 85%, to give the spray-dried particulate solid of Prep1, having expected d50 particle size from 18 to 25 micrometers.

Preparation 2 (Prep2): spray-dried Ziegler-Natta procatalyst system free of compound (B). Add anhydrous tetrahydrofuran (14 kg) to a feed tank. Next add finely-divided solid $MgCl_2$ (1255 g). Heat mixture to 60° C., and mix it for 5 hours to overnight to form a third solution. Cool third solution to 40° C. to 45° C. Then add $TiCl_3 \cdot AA$ (459 g), and mix for 1 hour. Then add hydrophobic pre-treated fumed silica (Cabosil TS-610, 1.6 kg) to give a suspension. Mix the suspension for 30 minutes to give a slurry, which has a blue color. Spray the slurry in a spray dryer using the spray-drying conditions of Prep1 to give a spray-dried solid. Contact the spray-dried solid with a chemically reducing effective amount of a reagent mixture of 40 wt % trihexylaluminum (TnHAl) reducing agent in mineral oil in a 4 liter (L) volume mix tank for approximately 1 hour to give spray-dried Ziegler-Natta procatalyst system.

Preparation 3: procedure for semi-batch, 2-methylpropane (isobutane) slurry phase polymerization. Use a 2-liter (L), stainless steel, stirred autoclave reactor having a top portion comprising a reactor head and being configured with a pitched blade turbine agitator, a heater, a reactor pressure set-point device, and reactor temperature set-point device. Charge the reactor with 1 L 2-methylpropane, 20 milliliters (mL) 1-hexene, and 0.87 mL of a 0.6 Molar (M) solution of triethylaluminum (TEAl) in hexane. The amount of TEAl is calculated based on the expected amount of catalyst so as to give a nominal TEAl-to-Ti molar ratio of 100. Turn on the pitched blade turbine agitator to 750 rotations per minute (rpm). Heat the reactor to a set-point temperature of 85° C. Add 3.8 L of $H_2$ gas into the reactor. Add ethylene to the reactor to achieve a set-point pressure of 862 kilopascals (kPa) (125 pounds per square inch (psi)). Weigh 10 milligrams (mg) of spray-dried Ziegler-Natta (pro)catalyst system (described later) into a pressurized gas cylinder under an inert atmosphere ($N_2$) in a drybox, and mount the cylinder on the reactor head. Inject the catalyst into the reactor using high pressure nitrogen gas to give a current reactor pressure. Adjust the reactor pressure set-point to the current reactor pressure, and feed ethylene into the reactor at a rate sufficient to maintain the current reactor pressure set-point pressure. After either 1 hour or 300 grams (g) of polymer produced, whichever comes first, stop the ethylene feed, vent the reactor, and cool the reactor contents to room temperature. Vent 2-methylpropane, open the reactor, and recover the polymer product, Inventive Examples A to F (IE(A) to IE(F)): copolymerize ethylene and 1-butene catalyzed by the spray-dried Ziegler-Natta catalyst system of Prep2 in the presence of different amounts of (B1) calcium (1R,2S)-cis-cyclohexane-1,2-dicarboxylate (1:1) in a slurry phase reactor according to Preparation 3 to give an ethylene/1-butene copolymer composition IE(A) to IE(F), respectively. Compound (B1) is added differently to the reactor in IE(A) than in IE(B) to IE(F). For IE(A) contact the spray-dried Ziegler-Natta procatalyst system of Prep2 with triethylaluminum (TEAl) in mineral oil, and mix for 1 hour to give a standard spray-dried Ziegler-Natta catalyst system. Feed the standard catalyst system into reactor and separately feed a mineral oil dispersion of (B1) calcium (1R,2S)-cis-cyclohexane-1,2-dicarboxylate (1:1) into reactor. For IE(B) to IE(F) contact the spray-dried Ziegler-Natta procatalyst system of Prep2 with an activator-nucleator formulation comprising triethylaluminum (TEAl) and (B1) calcium (1R,2S)-cis-cyclohexane-1, 2-dicarboxylate (1:1) in mineral oil, and mix for 1 hour to give an inventive spray-dried Ziegler-Natta catalyst system.

Inventive Example G (IE(G)): (prophetic) copolymerize ethylene and 1-butene catalyzed by the spray-dried Ziegler-Natta catalyst system of Prep2 in the presence of 102 ppm amounts of (B1) calcium (1R,2S)-cis-cyclohexane-1,2-dicarboxylate (1:1) in a FB-GPP Pilot Reactor using a gas phase method to give an ethylene/1-butene copolymer composition IE(G).

Comparative Examples A to C (CE(A) to CE(C)): replicate IE(A) except omit compound (B). Reactor and process conditions are listed later. Collected the comparative ethylene/1-butene copolymer composition from the reactor's product discharge outlet.

TABLE 1

Process/reactor conditions of IE(A) to IE(C).

| Reaction Constituent/Parameter | polymerizing condition IE(A) | polymerizing condition IE(B) | polymerizing condition IE(C) |
|---|---|---|---|
| spray-dried Ziegler-Natta catalyst system | IE(A) | IE(B) | IE(C) |
| (B1) calcium (1R,2S)-cis-cyclohexane-1,2-dicarboxylate (1:1) (ppm in reactor) | 102 | 48.3 | 48.3 |
| Method of feeding (B1) into reactor | Separate from TEAI | Mixture with TEAI | Mixture with TEAI |
| Catalyst Productivity (kg copolymer/kg catalyst) | 19,620 kg/kg | 34,366 kg/kg | 28,913 kg/kg |

TABLE 2

Process/reactor conditions of IE(D) to IE(F).

| Reaction Constituent/Parameter | polymerizing condition IE(D) | polymerizing condition IE(E) | polymerizing condition IE(F) |
|---|---|---|---|
| spray-dried Ziegler-Natta catalyst system | IE(D) | IE(E) | IE(F) |
| (B1) calcium (1R,2S)-cis-cyclohexane-1,2-dicarboxylate (1:1) (ppm in reactor) | 73.7 | 40 | 75 |
| Method of adding (B1) | Mixture with TEAI | Mixture with TEAI | Mixture with TEAI |
| Catalyst Productivity (kg copolymer/kg catalyst) | 33,927 kg/kg | 25,986 kg/kg | 25,678 kg/kg |

TABLE 3

Process/reactor conditions of CE(A) to CE(C).

| Reaction Constituent/Parameter | polymerizing condition CE(A) | polymerizing condition CE(B) | polymerizing condition CE(c) |
|---|---|---|---|
| spray-dried Ziegler-Natta catalyst system | CE(A) | CE(A) | CE(A) |
| (B1) calcium (1R,2S)-cis-cyclohexane-1,2-dicarboxylate (1:1) (ppm in reactor) | 0 | 0 | 0 |
| Catalyst Productivity (kg copolymer/kg catalyst) | 29,294 kg/kg | 23,240 kg/kg | 24,019 kg/kg |

TABLE 4 ethylene/1-butene copolymer compositions of IE(A) to IE(D).

| Polymer Property Measured | IE(A) Result | IE(B) Result | IE(C) Result | IE(D) Result |
|---|---|---|---|---|
| DSC Melting point, $T_m$ (° C.) | 132.6 | 130.85 | 131.2 | 131.07 |
| Isothermal Crystallization Temperature, $T_{ix}$ (° C.) | 122.5 | 122.5 | 122.5 | 122.5 |
| $T_m - T_{ix}$ (° C.) | 10.1 | 8.35 | 8.7 | 8.57 |
| Isothermal Crystallization Peak Time Period (minutes) | 3.52 | 2.56 | 2.97 | 2.21 |
| Density (ASTM D792-13), g/cm$^3$ | N/m | N/m | N/m | N/m |
| Melt Index $I_2$ (190° C., 2.16 kg, ASTM D1238-04), g/10 min. | N/m | N/m | N/m | N/m |
| Number-average molecular weight ($M_n$), g/mol | N/m | N/m | N/m | N/m |
| Weight-average molecular weight ($M_w$), g/mol | N/m | N/m | N/m | N/m |
| Molecular mass dispersity ($M_w/M_n$), $Đ_M$ | N/m | N/m | N/m | N/m |
| Settled Bulk Density (kg/m$^3$) | N/m | N/m | N/m | N/m |
| Fluidized Bulk Density (kg/m$^3$) | N/m | N/m | N/m | N/m |
| Comonomer Composition Distribution | N/m | N/m | N/m | N/m |

*N/m: not measured due to insufficient sample quantities.

TABLE 5 ethylene/1-butene copolymer compositions of CE(A) and CE(B).

| Polymer Property Measured | CE(A) Result | CE(B) Result |
|---|---|---|
| DSC Melting point, $T_m$ (° C.) | 132.69 | 132.38 |
| Isothermal Crystallization Temperature, $T_{ix}$ (° C.) | 122.5 | 122.5 |
| $T_m - T_{ix}$ (° C.) | 10.19 | 9.88 |
| Isothermal Crystallization Peak Time Period (minutes) | 4.34 | 4.74 |

TABLE 5-continued ethylene/1-butene copolymer compositions of CE(A) and CE(B).

| Polymer Property Measured | CE(A) Result | CE(B) Result |
|---|---|---|
| Density (ASTM D792-13), g/cm$^3$ | N/m* | N/m |
| Melt Index I$_2$ (190° C. 2.16 kg, ASTM D1238-04), g/10 min. | N/m | N/m |
| Number-average molecular weight (M$_n$), g/mol | N/m | N/m |
| Weight-average molecular weight (M$_w$), g/mol | N/m | N/m |
| Molecular mass dispersity (M$_w$/M$_n$), Đ$_M$ | N/m | N/m |
| Settled Bulk Density (kg/m$^3$) | N/m | N/m |
| Fluidized Bulk Density (kg/m$^3$) | N/m | N/m |
| Comonomer Composition Distribution | N/m | N/m |

*N/m: not measured due to insufficient sample quantities.

As shown by the data in Tables 4 to 5, addition of the constituent (B) to the reactants of the inventive samples unexpectedly did not harm productivity of the catalyst. Further, isothermal crystallization peak times for Inventive Examples were significantly lower than those for the Comparative Examples, which indicates that polymer crystallization rates are higher for the Inventive Examples than for the Comparative Examples. Still further, higher crystallization rates for the Inventive Examples beneficially yield an improved crystal morphology for the Inventive Examples, thereby improving properties such as barrier to water vapor and oxygen, film haze, gloss and clarity of inventive films made therefrom.

TABLE 6 ethylene/1-butene copolymer compositions CE(C), IE(E), and IE(F).

| | CE(C) | IE(E) | IE(F) |
|---|---|---|---|
| DSC Melting Point, T$_m$ (° C.) | 131.01 | 131.37 | 131.17 |
| Isothermal Crystallization Temperature, T$_{ix}$ (° C.) | CE(C) ICPTP* | IE(E) ICPTP | IE(F) ICPTP |
| 121.0 | 1.12 | N/t | N/t |
| 121.5 | 1.61 | N/t | N/t |
| 122.0 | 2.33 | N/t | N/t |
| 122.5 | N/t | 1.72 | N/t |
| 123.0 | N/t | 2.39 | 2.14 |
| 123.5 | N/t | 3.38 | 3.03 |
| 124.0 | N/t | N/t | 4.37 |

*ICPTP is Isothermal Crystallization Peak Time Period (minutes); N/t is not tested.

As shown by the data in Table 6, the isothermal crystallization temperatures required for Inventive Examples IE(E) and IE(F) to achieve a given crystallization peak time are higher than that for Comparative Example CE(C) to obtain a similar crystallization peak time. This indicates that the crystallization rates are higher for Inventive Examples than the Comparative Example.

The invention claimed is:

1. A method of polymerizing ethylene, and optionally 0, 1, or more alpha-olefin comonomers, in a gas phase or liquid phase polymerization process conducted in a gas phase or liquid phase polymerization reactor, the method comprising contacting ethylene, and optionally 0, 1, or more alpha-olefin comonomers, with a Ziegler-Natta catalyst system to give a semicrystalline polyethylene polymer; wherein the Ziegler-Natta catalyst system comprises a nucleating effective amount of a compound (B) selected from at least one of compounds (B1) to (B3): (B1) calcium (1R,2S)-cis-cyclohexane-1,2-dicarboxylate (1:1); (B2) calcium stearate (1:2), or (B3) zinc stearate (1:2) and (D) a Ziegler-Natta catalyst;
wherein the Ziegler-Natta catalyst system is a spray-dried Ziegler-Natta catalyst system further comprising at least one of a carrier material or an organic modifier that is tetrahydrofuran.

2. The method of claim 1 comprising the gas phase polymerization of the ethylene and the (C$_3$-C$_{20}$)alpha-olefin in the presence of molecular hydrogen gas (H$_2$) and, optionally, an induced condensing agent (ICA) in one, two or more gas phase polymerization reactors under polymerizing conditions, thereby making the semicrystalline polyethylene polymer; wherein the polymerizing conditions comprise a reaction temperature from 80 degrees (°) to 110° Celsius (C.); a molar ratio of the molecular hydrogen gas to the ethylene (H$_2$/C$_2$ molar ratio) from 0.001 to 0.050; and a molar ratio of the comonomer to the ethylene (comonomer/C$_2$ molar ratio) from 0.005 to 0.10.

3. The method of claim 1 wherein the (D) Ziegler-Natta catalyst is made from a Ziegler-Natta procatalyst system comprising an activating effective amount of (A) an alkylaluminum(chloride) compound of formula (I): Al((C$_1$-C$_6$)alkyl)$_m$(chloro)$_n$ (I), wherein subscript m is an integer from 1 to 3, subscript n is an integer from 2 to 0, the sum of subscripts m+n=3, and each chloro is a chlorine atom (compound (A)); the compound (B); and (C) a Ziegler-Natta procatalyst.

4. A semicrystalline polyethylene polymer made by the method of polymerizing of claim 1.

5. A manufactured article comprising the semicrystalline polyethylene polymer of claim 4.

6. The method of claim 1 comprising the liquid phase polymerization process conducted in a liquid phase polymerization reactor.

7. The method of claim 6 wherein the liquid phase polymerization process is a slurry phase polymerization process and the liquid phase polymerization reactor is a slurry phase polymerization reactor.

8. A semicrystalline polyethylene polymer made by the method of polymerizing of claim 6.

9. A manufactured article comprising the semicrystalline polyethylene polymer of claim 8.

* * * * *